United States Patent Office 3,697,286
Patented Oct. 10, 1972

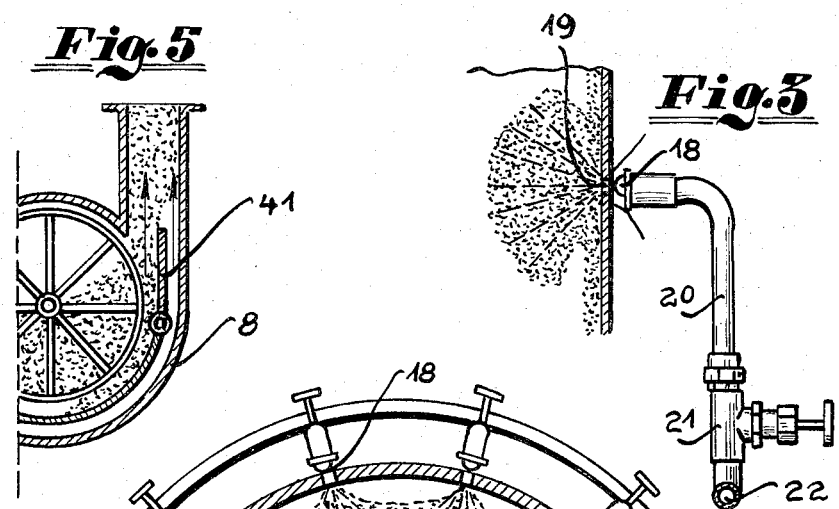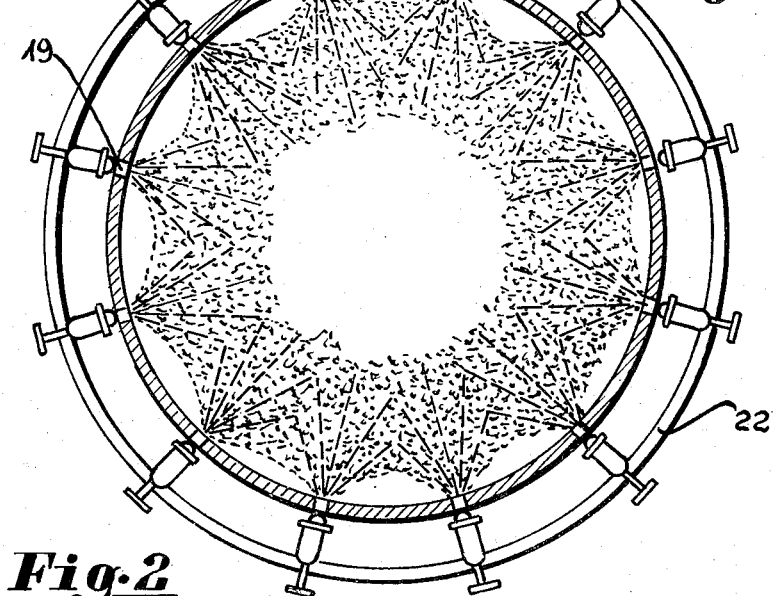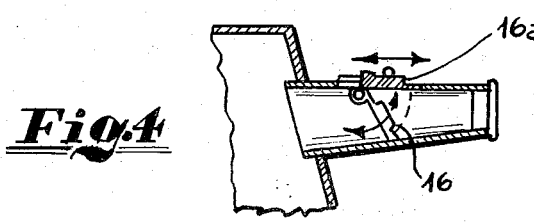

3,697,286
METHOD OF TREATING POWDER OR
GRANULATE SUBSTANCES
Gustav Grun, Lissberg/Oberhessen, Germany
Continuation-in-part of abandoned application Ser. No. 93,011, Mar. 1, 1961, which is a division of application Ser. No. 474,134, July 22, 1965, U.S. Patent No. 3,469,562, which in turn is a continuation of abandoned application Ser. No. 842,742, Feb. 13, 1969. This application Dec. 16, 1970, Ser. No. 98,946
Int. Cl. A23c 9/00; B44d 1/02
U.S. Cl. 99—56
3 Claims

ABSTRACT OF THE DISCLOSURE

Substances in powder or granulate form are treated with substances in fluid form by injecting the powder or granulate substance downwardly in a reaction chamber into a spraying zone substantially removed from the upper end of the reaction chamber and near an outlet at the lowermost end of the reaction chamber while at the same time spraying the fluid substance into the spraying zone through a plurality of peripherally spaced openings in the side wall of the reaction chamber from nozzles located outside the chamber near the lowermost end of the chamber. During spraying, air is drawn through the outlet opening and upwardly through the chamber whereby the powder or granulate substance is caused to swirl in cloud formation while being treated with the fluid substance. The air is drawn upwardly at a rate to maintain the lighter and untreated substances in whirling motion and to allow the heavier treated substances to pass through the outlet opening by the action of gravity.

CROSS REFERENCE TO RELATED APPLICATIONS

This application is a continuation of application Ser. No. 842,742, now abandoned, which is a division of application Ser. No. 474,134, filed July 22, 1965, now U.S. Pat. No. 3,469,562, issued Sept. 30, 1969, and which is a continuation-in-part of my copending application Ser. No. 93,011, filed Mar. 1, 1961, for "Process for Treating Powdered or Granulated Substances," now abandoned.

The objectives to be obtained by a treatment of powder or granulated substances with active or stabilizing substances, in gaseous, liquid, or solid form, may differ. Thus, in producing one product, a requisite is the complete absence of dust. In another product, it is a requisite that the product be soluble in water or other liquid, while in still a third product, a requisite is that it be miscible with another substance, such as an odorous substance. Furthermore, still another product may have the requisite that it have grains of a particular size.

Frequently, two or even all of these requirements must be met simultaneously. It has been found, by tests, that a substantial improvement of the treated products with respect to meeting the above-mentioned requirements, a better control of the process, and greater safety can be achieved by various modifications of the process.

In accordance with one feature of the invention, the treatment chamber is subdivided into a turbulence zone and a steadying zone by extending the material separating inlet well into the treatment chamber.

In accordance with another feature of the invention, the spray nozzle means is subdivided into a plurality of spray nozzles located outside of the treatment chamber. These nozzles are arranged annularly around the outside of the treatment chamber each adjacent an aperture in the side wall thereof, these apertures being spaced peripherally around the side wall of the treatment chamber. The spray nozzles are directed coaxially through the respective apertures and toward the axis of the treatment chamber.

In accordance with another feature of the invention, two or more annular spray rings are arranged in spaced relation one above the other, and provided with monitoring and switching means to disconnect all the supplies simultaneously in the absence of any one of the supplies, so that there is no after-dripping of liquid from the spray nozzles.

In accordance with still a further feature of the invention, the material to be treated drops from the treatment chamber directly into a drying tower. Thus, there is no mechanical stress exerted on the granular treated material even during tthe drying process. The treated particles always leave the treatment chamber, and pass through the drying tower, in a suspended, slowly sinking state, and are dried gently and then either filled into bags or packed directly beneath the drying tower.

A further feature of the invention is to improve the dust return and increase the degree of dust removal, and particularly to provide uniform dust return in the case of sprayed dust. This is effected by exhausting the dusts into dual separator means by means of a medium pressure blower, and injecting the dusts tangentially into the treatment chamber. Adjustment and regulation of a separation eddy at the separator outlets is effected by apertures or bores formed in bends of a suction line, these apertures or bores influencing the separation eddies at the outlets of the separators. The apertures or bores may be completely or partly closed by means of a displaceable sleeve of rubber or the like.

In accordance with a further feature of the invention, conveying, weighing, and control devices are arranged in such a way that the powder or granulate substance is emptied into a hopper by means of a remote controlled charging balance. This charging balance delivers the dry substance to the hopper in small quantities or metered amounts, such as 5 kg. or less, and these metered amounts or batches are released during predetermined time intervals under control of timing relays. Each metered amount is supplied to the hopper during a predetermined time interval continuing until the next metered amount is ready to be discharged. This is effected by means of an infinitely variable bucket wheel lock discharging into a distribution worm and through a circulating air-fly wheel with a built-in injector. Thereby the material is delivered uniformly to a pneumatic conveyor for discharge into the treatment chamber.

Accordingly, an object of the invention is to provide an improved process for treating powdered or granular first substances with gaseous, liquid, or solid second substances.

A further object of the invention is to provide such an improved process including a treatment chamber which is subdivided into a turbulence zone and a steadying zone by a material separating inlet element extending downwardly into the treatment chamber.

Yet another object of the invention is to provide such an improved process in which a plurality of spray nozzles, positioned exteriorly of the treatment chamber in an annular ring, discharge the second substances into the treatment chamber through peripherally spaced apertures at a spray region within the treatment chamber, these spray nozzles spraying the second substances coaxially of the apertures and toward the vertical axis of the treatment chamber.

Still another object of the invention is to provide an improved process of the type just mentioned in which the second substance or substances are sprayed into the treatment chamber by means of plural vertically spaced spray rings.

Still a further object of the invention is to provide an improved process in which the treated particles leaving the treatment chamber pass through a drying tower in a suspended slowly sinking state whereby they are dried gently.

Another object of the invention is to provide an improved process of the type mentioned in which dust return is improved and an increase of the degree of dust removal is attained, and in which a uniform dust return is supplied with sprayed dusts.

In accordance with the mentioned tests, it has further been found that similarity and uniformity of the granular structure depends on how the original product was mixed. These tests have shown that a material mixed in an air mixer, such as shown in German Pat. No. 1,152,- 877, yields better results with respect to the uniformity of the granular materials.

For an understanding of the principles of the invention, reference is made to the following description of typical embodiments thereof as illustrated in the accompanying drawings.

In the drawings:

FIG. 2 is a transverse sectional view through a treatment chamber, illustrating the annular arrangement of the spray nozzles about the exterior of the treatment chamber;

FIG. 3 is a partial vertical sectional view through an injection aperture and illustrating a nozzle, the supply means therefor, the hand control valve and the annular conduit;

FIG. 4 illustrates a detail of a flap valve and a slide valve controlling flow of material to the dust separators; and FIG. 5 is a partial diametrical sectional view through the air fly wheel and illustrating the injector flap.

Figure 1:
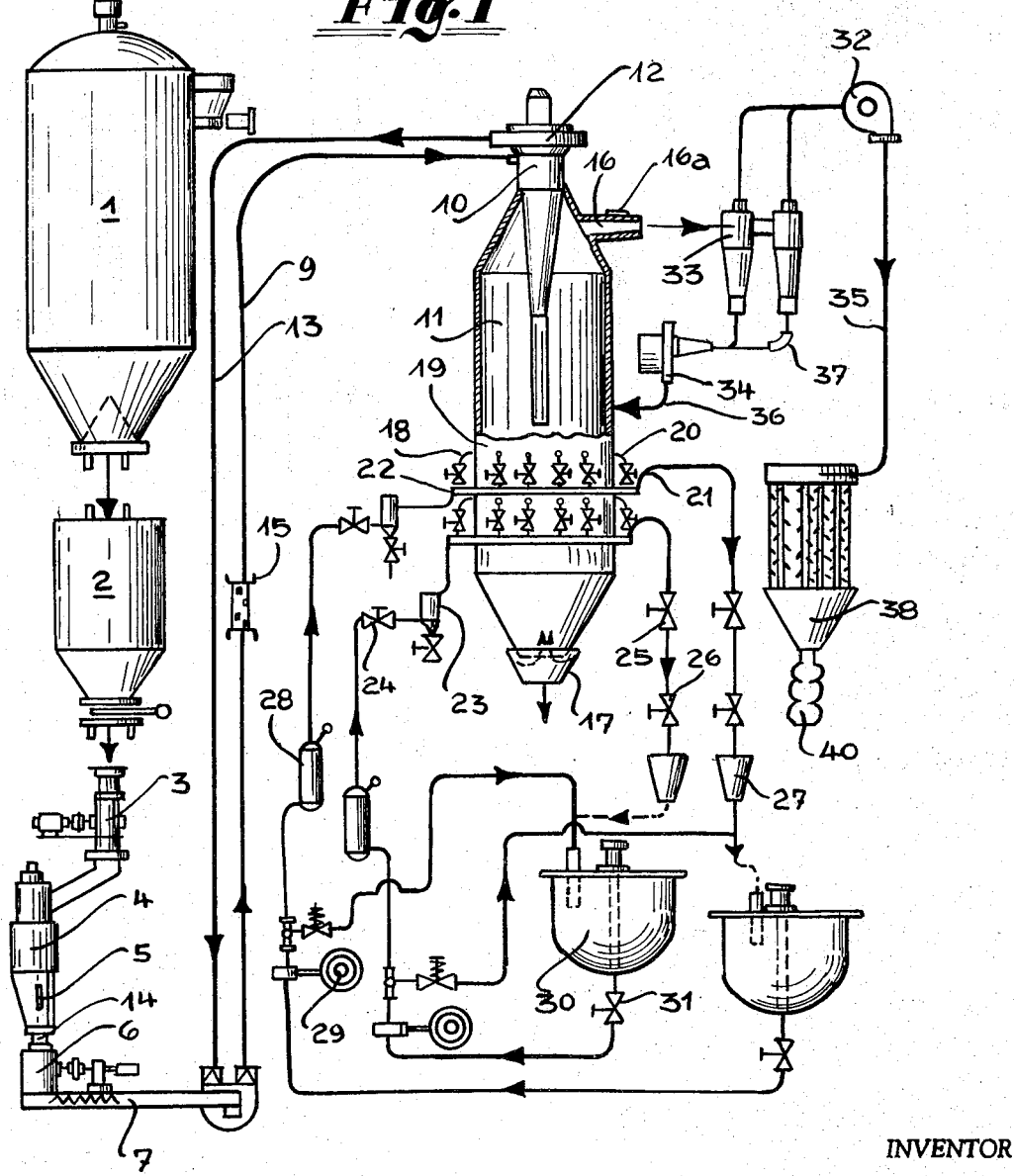
FIG. 1 is a somewhat schematic flow diagram illustrating the process of the invention.

In the process diagram shown in FIG. 1, an air mixer is arranged ahead of the spraying operation proper. In the air mixer 1, the individual components are mixed gently by means of air. The mixing time is 10–20 seconds, so that a uniform flow is attained without formation of bridges, particularly in fine powdered substances. The mixing is effected in batches, which are then fed to the secondary tank 2. From secondary tank 2, the mixed first substances, of a powdered or granular nature, flow through a coarse dosing lock or sluice 3 into a balance 4. Balance 4 delivers relatively small batches or metered quantities of the mixed powdered or granular material into a hopper 5.

Balance 4 is operatively associated with a timing relay which, at the expiration of a predetermined time interval, initiates tipping of the balance to deliver a charge into the hopper 5. During the same time interval, the material contained in hopper 5 has been fed through an infinitely variable bucket wheel lock or sluice 6, a worm conveyor 7, and an air fly wheel 8 to a pneumatic conveyor or lift 9. Conveyor 9 delivers the material into the treatment chamber 11 through a separator 10 which discharges the material in the lower portion of the treatment chamber 11.

The interior of treatment chamber 11 is at a negative pressure of 50–80 mm. water column. The conveying air for pneumatic conveyor 9 flows through blower 12, return line 13 and fly wheel 8 in a continuous cycle. By observation of a cylinder glass 14, it is possible to regulate the dosing effected by bucket wheel lock 6, having an infinite variable drive, in such a manner that the material is removed from hopper 5 right up to the beginning of the next charge from balance 4. Thus, a very accurate dosing of the granular or powdered substance is possible, because the weight accuracy from one batch to the next, for example, at 5 kg., is determined by the balance. These 5 kg. batches, for example, are distributed throughout a 14 second charging period to the bucket wheel lock 6. A further check is possible by observation of the glass cylinder or inspection glass 15. Any interruptions or gaps in the flow of the powdered or granular material can be equalized by adjustment of the infinitely variable drive of the bucket wheel lock 6.

Fly wheel 8 has the function of accelerating the material to the conveying speed to avoid a pulsating conveying movement, and also the function of reducing the pressure downstream of bucket wheel lock 6, by means of the injector 41 illustrated in FIG. 5. These measures are necessary to insure a trouble-free flow of powdered substances or different quality through bucket wheel lock 6.

The negative pressure produced in treatment chamber 11 by low pressure blower 12, and which can be varied by the regulating flap 16 and the slide valve 16a shown in FIG. 4, causes air to be drawn into treatment chamber 11 through the outlet 17, this air flowing upwardly through the descending dry or granular material. By virtue of this, the dry or granular material is flung upwardly in a sort of central fountain, and forms a cloud into which the spray nozzle 18, arranged as an annular set around the exterior treatment chamber 11, spray the second substance or liquid in finely dispersed form through peripherally spaced apertures 19 in the side wall of treatment chamber 11, as best illustrated in FIG. 2. By virtue of this type of spraying, the deposit of spray material on the jacket of the treatment chamber is prevented, and a maximum surface contact and uniform distribution of the liquid in the dry material is obtained. The spray nozzles 18 direct the liquid spray coaxially of the apertures 19 and toward the vertical axis of treatment chamber 11.

In the usual manner, the liquid second substance is fed by means of charging or dosing piston pumps 29, including the necessary safety fittings, and is delivered through pressure equalizing tanks 28 to the main access diaphragm valves 24. Downstream of each diaphragm valve 24 there is arranged a pressure filter 23 which is directly in front of the associated annular supply conduit for nozzles 18. The liquid from pressure filter 23 flows, through the annular distribution conduits 22, to the individual nozzle connections 20 which, as best seen in FIG. 3, are each controlled by a hand valve 21. Opposite each inlet duct leading from a pressure filter 23 to a conduit 22, a discharge conduit is connected to each conduit 22. As best seen in FIG. 1, this discharge conduit is arched upwardly through 180° of arc and to a height which is lower than the height of the individual nozzle connections between the associated ring conduit 22 and the spray nozzles 18.

Each conduit 22 can be discharged through a diaphragm valve 25 and through a lateral offtake provided with a hand valve 26. Diaphragm valves 24 and 25 are remote controlled by a suitable control valve associated with each one thereof. The hand valve 26 serves to regulate the amount of liquid injected under the required nozzle pressure. In effect, the arrangement comprises a return flow arrangement with a specific inlet pressure and a specific outlet pressure, so that the liquid is sprayed into the treatment chamber 11 under the differential between the inlet pressure and the outlet pressure in the associated annular supply conduit 22. Preferably, hand valve 26 is designed as a needle valve, and is arranged to be throttled until the desired differential or working pressure has been attained.

The return liquid flows into hoppers 27 from which it may be discharged into a suitable tank or returned to the fat tank 30 which is normally charged from a liquid preparation plant which has not been shown. The fat tanks 30 are equipped with level indicators, thermostats and automatic controls. Discharge from the fat tanks 30 is effected by a conduit extending to the suction sides of the charging pumps 29, each conduit having a hand valve 31 therein.

The air flowing upwardly through treatment chamber 11 from the outlet 17 thereof is drawn through separators 33 by a blower 34 which delivers the dust, separated from the air, back to the treatment tank 11. In order to maintain and adjust the separation to an optimum degree, and to effect efficient return of the dust through blower 34, a regulating flap is arranged in the suction line. As best illustrated in FIG. 4, this regulating means comprises a pivotal flap valve 16 and a slide valve 16a. When flap valve 16 is closed, the air current through treatment chamber 11 is throttled. The cross sectional area above flap valve 16a increases, and can be regulated by slide valve 16a so that the separators 33 perform an optimum degree of separation.

The harmful effects of pulsation currents, occurring in the treatment chamber, on the separation eddies at the outlets of separators 33 are avoided by exhausting, from both separators, some air along with the dust and injecting it by means of the separate high pressure blower 34 and the connecting line 36 tangentially into treatment chamber 11 in the same direction as the dust conveying current. Each separator has a separate exhaust line, and these two lines are united immediately ahead of blower 34, the lines having bends therein. These bends are provided with several apertures or openings which are normally covered by sleeves 37 of rubber or the like and which are opened only in case of clogging. Exhaust of air from separators 33 is effected by a suction blower 32, and the exhaust air is delivered to a pressure filter 38 having a collecting hopper and an outlet duct 39 which may receive a collecting bag 40.

The following examples will illustrate the operation of the invention. Of these examples, the first two relate to the production of a milk substitute feed which has 17% fat, and of a skim milk feed with up to 55% fat.

EXAMPLE 1

The starting components comprise 30% sprayed skim milk, 30% rolled skim milk, 10% sugar or swelling starch, 10-15% whey powder and 1% vitamins, and these components are thoroughly mixed in air mixer 1 and discharged, after mixing, into tank 2. The remainder of the starting mixture is fat.

While the mixing of the components is effected in batches, the fat is sprayed continuously into the treatment chamber. From tank 1, mixed milk powder flows through bucket wheel lock 3 into balance 4 and is fed through glass cylinder 14, bucket wheel lock 6, worm conveyor 7, air fly wheel 8 and pneumatic conveyor 9 into spreader 10 and thus delivered to the lower part of treatment chamber 11. This is effected continuously and with a uniform flow delivering a predetermined output to the treatment chamber 11. After a predetermined time interval of from 10 to 40 seconds, the fat is automatically introduced by operating the corresponding diaphragm valves 24. The end product is discharged from the outlet of hopper 17 and filled into bags.

EXAMPLE 2

In this example, instead of the previously mentioned components, only sprayed skim milk or roller skim milk is used and these are fed to tank 2 without mixing. The procedure is the same as in Example 1, with the difference that the air entering through outlet 17 from the exterior is cooled to $+5°$ C. by means of a cooling unit. The amount of heat which must be eliminated by cooling corresponds approximately to the heat evolved by solidification of the fat. The extent of cooling influences the finess of the end product.

EXAMPLE 3

In this example, powdered substances are treated to increase their solubility in the same manner as the powdered skim milk concentrate is treated in the previous two examples. For example, this example may relate to the productions of a mixture for cocoa drinks, such as that known as "Kakaotrunk." The components consist of 73.5% powdered sugar, 25% starch, and 1.5% flavor substance. These components are homogeneously mixed in air mixer 1 and subsequently sprayed with 10% water, which is effected by the spray treatment in treatment chamber 11 in the same manner as described in Example 2. The product is then dried down to 5% by means of a cooling-drying tower arranged beneath the spray tank. The product thus obtained shows a uniform granular structure, has a loose or porous composition, is highly hygroscopic, and dissolves rapidly in either water or milk.

EXAMPLE 4

In this example, easily soluble grain flours are produced using the same procedure as in Example 3. The difference is that the flour is first reduced to a finess of 50 m$\mu$ and is subsequently subjected to the spray process by adding about 10% water in chamber 11. The product is finally dried down to a normal moisture of 14% while passing through the suspension drier.

While specific embodiments of the invention have been shown and described in detail to illustrate the application of the principles of the invention, it will be understood that the invention may be embodied otherwise without departing from such principles.

What is claimed is:

1. In a process for treating a first substance in powder or granulate form with a second substance, in fluid form, within a reaction chamber having an outlet of reduced cross-section opening at the lowermost end thereof and in which a first substance to be treated is continuously directed downwardly into the reaction chamber, a second substance is continuously directed against the first substance, and the upper end of the reaction chamber is continuously exhausted to direct air into the opening at the lowermost end of the reaction chamber and thence upwardly into the reaction chamber and through the first and second substances to cause the particles of the first substance to swirl in a cloud formation and to cause the second substance to treat the particles of the first substance while continuously removing gas and entrained particles from the upper end of the reaction chamber, the exhausting being effected by an amount and rate sufficient to maintain the lighter and untreated substances in whirling motion in the cloud formation and including continuously removing heavier particles of the first substance, which have been treated with the second substance, through the outlet opening at the lowermost end of the reaction chamber by the action of gravity: the improvement comprising continuously directing the first substance immediately into the region of a spraying zone at a point spaced very substantially from the upper end of the reaction chamber and close to a reduced cross-section outlet opening at the lowermost end of the reaction chamber; and spraying the second substance into such spraying zone through a plurality of peripherally spaced openings in the side wall of the reaction chamber from nozzles positioned outside the reaction chamber and each aligned with a respective peripheral opening.

2. In a process for treating a first substance with a second substance, the improvement claimed in claim 1, including directing the second substance into the reaction chamber at plural vertically spaced spray regions.

3. In a process for treating a first substance with a second substance, the improvement claimed in claim 2, including spraying different second substances simultaneously into the vertically spaced spraying zones.

References Cited
UNITED STATES PATENTS

| | | | |
|---|---|---|---|
| 3,469,562 | 9/1969 | Grun | 118—24 |
| 3,120,438 | 2/1964 | McIntire et al. | 99—56 |
| 2,856,290 | 10/1958 | Peebles | 99—139 |
| 2,835,586 | 5/1958 | Peebles | 99—56 |
| 2,594,469 | 4/1952 | Mahoney | 117—100 |

JOSEPH M. GOLIAN, Primary Examiner

D. M. NAFF, Assistant Examiner

U.S. Cl. X.R.

99—26, DIG. 4, 93; 117—100 R; 118—24